(12) United States Patent
Kim et al.

(10) Patent No.: US 11,346,015 B2
(45) Date of Patent: May 31, 2022

(54) ELECTROLYTIC COPPER FOIL HAVING HIGH-TEMPERATURE DIMENSIONAL STABILITY AND TEXTURE STABILITY, AND MANUFACTURING METHOD THEREFOR

(71) Applicant: KCF Technologies Co., Ltd., Anyang-si (KR)

(72) Inventors: Seung Min Kim, Anyang-si (KR); Joong Kyu An, Anyang-si (KR); Shan Hua Jin, Anyang-si (KR)

(73) Assignee: KCF TECHNOLOGIES CO., LTD., Anyang-si (KR)

( * ) Notice: Subject to any disclaimer, the term of this patent is extended or adjusted under 35 U.S.C. 154(b) by 0 days.

(21) Appl. No.: 16/959,360

(22) PCT Filed: Jan. 25, 2019

(86) PCT No.: PCT/KR2019/001070
§ 371 (c)(1),
(2) Date: Jun. 30, 2020

(87) PCT Pub. No.: WO2019/151719
PCT Pub. Date: Aug. 8, 2019

(65) Prior Publication Data
US 2021/0025067 A1    Jan. 28, 2021

(30) Foreign Application Priority Data
Feb. 1, 2018  (KR) ........................ 10-2018-0013092

(51) Int. Cl.
*C25D 7/06*    (2006.01)
*C25D 1/04*    (2006.01)
(Continued)

(52) U.S. Cl.
CPC ................. *C25D 1/04* (2013.01); *C25D 3/38* (2013.01); *H01M 4/661* (2013.01); *H01M 10/052* (2013.01); *Y10T 428/12431* (2015.01)

(58) Field of Classification Search
None
See application file for complete search history.

(56) References Cited

U.S. PATENT DOCUMENTS 6,679,983 B2    1/2004  Morrissey et al.
9,711,799 B1    7/2017  Lai et al.
(Continued)

FOREIGN PATENT DOCUMENTS

CN    101135058 A    3/2008
EP    3067442 A1     9/2016
(Continued)

OTHER PUBLICATIONS

Woo, et al; "The effect of surface morphology and crystal structure on the thickness of copper foil"; Journal of Korean Institute of Metals and Materials; Aug. 2007; vol. 45, No. 8; pp. 478-483; (7 pages).
(Continued)

*Primary Examiner* — Seth Dumbris
(74) *Attorney, Agent, or Firm* — K&L Gates LLP

(57) ABSTRACT

The present invention relates to: an electrolytic copper foil having high dimensional stability and texture stability in a high temperature environment of a process for manufacturing an Li secondary battery; and a manufacturing method therefor. The electrolytic copper foil of the present invention has a thermal expansion coefficient of 17.1-22 μm/(m·° C.) in a temperature region of 30-190° C., has a variation of full width at half maximum of the (220) plane of 0.81-1.19
(Continued)

according to heat treatment for 30 minutes at 190° C., and has a weight deviation of 5% or less in the transverse direction.

5 Claims, 1 Drawing Sheet

(51) Int. Cl.
  *C25D 3/38*  (2006.01)
  *H01M 4/66*  (2006.01)
  *H01M 10/052*  (2010.01)

(56) References Cited

U.S. PATENT DOCUMENTS

| | | | |
|---|---|---|---|
| 2002/0015833 A1 | 2/2002 | Takahashi et al. | |
| 2011/0139626 A1* | 6/2011 | Saito .................. | C25D 7/0635 205/50 |
| 2014/0057170 A1 | 2/2014 | Cha et al. | |

FOREIGN PATENT DOCUMENTS

| | | |
|---|---|---|
| JP | H06146052 A | 5/1994 |
| JP | 2000256866 A | 9/2000 |
| JP | 2001140091 A | 5/2001 |
| JP | 2003101176 A | 4/2003 |
| JP | 2006168365 A | 6/2006 |
| JP | 2009138245 A | 6/2009 |
| JP | 2012022939 A | 2/2012 |
| JP | 2012169597 A | 9/2012 |
| JP | 2013060660 A | 4/2013 |
| JP | 2017095807 A | 6/2017 |
| JP | 2017101320 A | 6/2017 |
| JP | 2018063938 A | 4/2018 |
| KR | 20150062228 A | 6/2015 |
| KR | 101673472 B1 | 11/2016 |
| KR | 20170035783 A | 3/2017 |
| KR | 20170036262 A | 4/2017 |
| KR | 20170046328 A | 5/2017 |
| KR | 20170048754 A | 5/2017 |
| WO | WO-2016208869 A1 * | 12/2016 ........ H01M 10/0525 |

OTHER PUBLICATIONS

International Search Report for related International Application No. PCT/KR2019/001070; report dated Aug. 8, 2019; (5 pages).
Written Opinion for related International Application No. PCT/KR2019/001070; report dated Aug. 8, 2019; (4 pages).
Extended European Search Report for related European Application No. 19746706.1; action dated Oct. 7, 2021; (9 pages).
Chinese Office Action for related Chinese Application No. 201980011125.5; action dated Jan. 17, 2022; (13 pages).

* cited by examiner

ELECTROLYTIC COPPER FOIL HAVING HIGH-TEMPERATURE DIMENSIONAL STABILITY AND TEXTURE STABILITY, AND MANUFACTURING METHOD THEREFOR

CROSS-REFERENCE TO RELATED APPLICATIONS

The present application is a National Stage of International Application No. PCT/KR2019/001070, filed Jan. 25, 2019, which claims priority to Korean Application No. 10-2018-0013092, filed on Feb. 1, 2018, the disclosure of which are incorporated herein by reference.

FIELD OF THE INVENTION

The present disclosure relates to an electrolytic copper foil, and more particularly to an electrolytic copper foil having high dimensional stability and texture stability in a high-temperature environment of a process of manufacturing a lithium secondary battery and a method of manufacturing the same.

BACKGROUND OF THE INVENTION

With increased use of portable electronic devices, such as mobile phones and laptop computers, and the propagation of hybrid electric vehicles, the demand for lithium secondary batteries has abruptly increased.

In a lithium secondary battery, an electrolytic copper foil is mainly used for the material of a negative electrode current collector. The electrolytic copper foil is manufactured through a foil manufacturing process using an electroplating method. In the case in which production conditions are not precisely controlled at the time of manufacturing the electrolytic copper foil, a large number of wrinkles or tears, which are caused when a thin film is manufactured, may occur. Such defects of copper foil products are a prime cause of increased manufacturing costs at the time of producing copper foils. In addition, curls and wrinkles are a prime cause of the deterioration of the quality of lithium secondary batteries and of the increase in total quality-control expenses.

Meanwhile, wrinkles or tears may also occur in a process of manufacturing a lithium secondary battery using the manufactured electrolytic copper foil. This phenomenon may result from the physical properties of the copper foil, or may result from the environment in which the lithium secondary battery is manufactured or changes in the electrolytic copper foil, which is exposed to the manufacturing environment, over time.

BRIEF DESCRIPTION OF THE INVENTION

Therefore, the present disclosure relates to an electrolytic copper foil that is capable of preventing problems resulting from limitations and shortcomings of the related art described above and a method of manufacturing the same.

It is an object of the present disclosure to provide an electrolytic copper foil configured such that the likelihood of the electrolytic copper foil being wrinkled and/or torn is reduced when exposed during a process of manufacturing a secondary battery.

It is another object of the present disclosure to provide a method of manufacturing an electrolytic copper foil configured such that the likelihood of the electrolytic copper foil being wrinkled and/or torn is reduced when exposed during a process of manufacturing a secondary battery.

In accordance with an aspect of the present disclosure, the above and other objects can be accomplished by the provision of an electrolytic copper foil having a first surface and a second surface, wherein the coefficient of thermal expansion of the electrolytic copper foil, measured while the temperature is increased from 30 to 190° C. at a speed of 5° C./min, is 17.1 to 22 μm/(m·° C.), the alteration rate of the full width at half maximum of (220) plane of the electrolytic copper foil due to heat treatment at 190° C. for 30 minutes is 0.81 to 1.19, the full width at half maximum of (220) plane being calculated using Equation 1 below, Alteration rate of full width at half maximum of (220) plane=full width at half maximum of (220) plane after heat treatment/full width at half maximum of (220) plane before heat treatment, and  (Equation 1)

the lateral weight deviation of the electrolytic copper foil is 5% or less.

The difference between Rz of the first surface and Rz of the second surface of the electrolytic copper foil may be 0.65 μm or less, and the difference between Ra of the first surface and Ra of the second surface of the electrolytic copper foil may be 0.18 μm or less.

The electrolytic copper foil may include a first passivation layer, which forms the first surface, and a second passivation layer, which forms the second surface, each of the first passivation layer and the second passivation layer being a rust-proof layer.

The electrolytic copper foil may have a thickness of 4 to 30 μm.

Rz of the first surface and Rz of the second surface may be 2.5 μm or less.

In accordance with another aspect of the present disclosure, there is provided a method of manufacturing an electrolytic copper foil by applying electric current between a positive electrode plate and a rotary negative electrode drum, disposed in an electrolytic solution in an electrolytic bath so as to be spaced apart from each other, in order to electroplate a copper film on the rotary negative electrode drum, wherein the electrolytic solution includes 70 to 100 g/L of copper ions, 80 to 130 g/L of sulfuric acid, 55 ppm or less of $Pb^{2+}$ ions, and 2 to 17 ppm of 4-mercaptopyridine, the content of total organic carbon (TOC) in the electrolytic solution is 450 ppm or less, the distance between the positive electrode plate and the rotary negative electrode drum is 5 to 15 mm, and the difference between the maximum distance and the minimum distance between the positive electrode plate and the rotary negative electrode drum is 0.2 mm or less.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Reference will now be made in detail to the preferred embodiments of the present disclosure, examples of which are illustrated in the accompanying drawings.

When manufacturing an electrolytic copper foil, various kinds of organic additives and metal additives are used in order to control the characteristics of a thin film. In an electrolytic plating process, the organic additives and the metal additives are vacant together with copper in a copper thin film. In general, the dimensional change of copper depending on temperature change, i.e. the coefficient of thermal expansion (CTE) of copper, is known to be about 16.5 μm/(m·° C.). However, the coefficient of thermal expansion is different from the theoretical value thereof due to the presence of an additive, which is added and vacant at the time of manufacturing the copper thin film. Therefore, it is necessary to appropriately control the kind and concentration of the additive that is added at the time of manufacturing the electrolytic copper foil in consideration of a subsequent process of manufacturing a lithium secondary battery.

Figure 1:
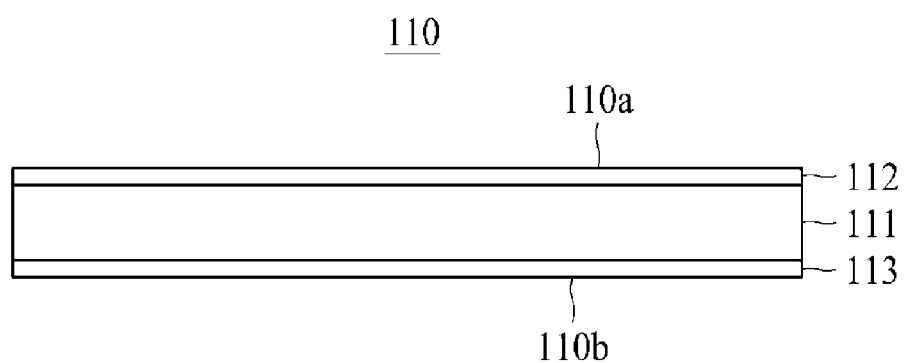
FIG. 1 is a sectional view schematically showing an electrolytic copper foil according to an embodiment of the present disclosure.

FIG. 1 is a sectional view schematically showing an electrolytic copper foil according to an embodiment of the present disclosure.

Referring to FIG. 1, the electrolytic copper foil, denoted by reference numeral 110, has a first surface 110a and a second surface 110b.

The electrolytic copper foil 110 includes a copper film 111. Optionally, the electrolytic copper foil 110 according to the present disclosure may further include a first passivation layer 112, which forms the first surface 110a, and a second passivation layer 113, which forms the second surface 110b. Each of the first and second passivation layers 112 and 113 may be a rust-proof layer.

In the present disclosure, the electrolytic copper foil 110 has a predetermined thickness, for example, a thickness of 4 to 30 μm. In the case in which the thickness of the copper foil is less than 4 μm, workability in a battery manufacturing process is deteriorated. In the case in which the thickness of the copper foil is greater than 30 μm, it is difficult to realize high capacity of a lithium secondary battery at the time of manufacturing the lithium secondary battery due to the great thickness of the copper foil.

The electrolytic copper foil 110 is formed on a rotary negative electrode drum by electroplating. The electrolytic copper foil 110 has a shiny surface (an S surface), which is the surface that is in direct contact with the rotary negative electrode drum during electroplating, and a matte surface (an M surface), which is opposite the shiny surface. For example, in the present disclosure, the first surface 110a may be the S surface, and the second surface 110b may be the M surface.

In order to inhibit the occurrence of wrinkles and tears in the process of manufacturing the secondary battery, the electrolytic copper foil 110 according to the present disclosure has a coefficient of thermal expansion within a controlled range.

Specifically, the electrolytic copper foil according to the present disclosure has a coefficient of thermal expansion of 17.1 to 22 μm/(m·° C.) in a temperature range of 30 to 190° C., within which a lithium secondary battery is manufactured. The coefficient of thermal expansion of the electrolytic copper foil in the temperature range of 30 to 190° C. may be measured while the temperature is increased from 30 to 190° C. at a speed of 5° C./min. In the case in which the coefficient of thermal expansion in this temperature range is less than 17.1 μm/(m·° C.), the dimensional change due to the temperature increase is small, whereby the copper foil may be torn by stress and heat applied thereto in a secondary battery manufacturing process. In the case in which the coefficient of thermal expansion is greater than 22 μm/(m·° C.), on the other hand, the copper foil may be deformed by heat applied thereto in a process of manufacturing a lithium secondary battery, whereby wrinkles may be formed in the copper foil.

In addition, a change in the crystal texture of the electrolytic copper foil according to the present disclosure is maintained within a predetermined range under the temperature in which the copper foil is placed during the secondary battery manufacturing process. Specifically, in the present disclosure, the full width at half maximum of a characteristic peak on an XRD pattern corresponding to (220) plane of the electrolytic copper foil (hereinafter, referred to as the "full width at half maximum of (220) plane") is controlled so as to be maintained within a predetermined range.

In the present disclosure, in the case in which the electrolytic copper foil is thermally treated at 190° C. for 30 minutes, it is preferable for a alteration rate of the full width at half maximum of (220) plane due to heat treatment, expressed by the following equation, to be 0.81 to 1.19 at both the first surface 110a and the second surface 110b.

Alteration rate of full width at half maximum of (220) plane=full width at half maximum of (220) plane after heat treatment/full width at half maximum of (220) plane before heat treatment (Equation 1)

In the case in which the alteration rate of the full width at half maximum of (220) plane deviates from a range of 0.81 to 1.19, the alteration of crystal particles undergoing heat treatment is excessively great, and thus workability is remarkably reduced in a roll-to-roll process. Specifically, in the case in which the alteration rate of the full width at half maximum of (220) plane is greater than 1.19, the size of the crystal particles is excessively decreased, whereby wrinkles are easily formed in the copper foil. In the case in which the alteration rate of the full width at half maximum of (220) plane is less than 0.81, on the other hand, the size of the crystal particles is excessively increased, whereby the copper foil is easily torn when tensile force is applied to the copper foil after heat treatment in the roll-to-roll process. In the present disclosure, the lateral weight deviation of the electrolytic copper foil is maintained at 5% or less. In the case in which the lateral weight deviation of the electrolytic copper foil is greater than 5%, wrinkles are formed in the portion of the copper foil that has a great lateral weight deviation when tensile force is applied to the copper foil in the roll-to-roll process at the time of manufacturing the lithium secondary battery.

In addition, the surface roughness of the M surface and the S surface of the electrolytic copper foil according to the present disclosure is maintained within a predetermined range. In the specification of the present disclosure, the surface roughness is a value that is measured according to JIS B 0601 (2001) standards.

In the electrolytic copper foil according to the present disclosure, the difference between Rz of the first surface 110a and Rz of the second surface 110b may be 0.65 μm or less, and the difference between Ra of the first surface 110a and Ra of the second surface 110b may be 0.18 μm or less. In the case in which the Rz difference is greater than 0.65 μm and the Ra difference is greater than 0.18 μm, the force of adhesion between a negative electrode material and the copper foil at the first surface 110a may be different from the force of adhesion between the negative electrode material and the copper foil at the second surface 110b after the negative electrode material is coated, whereby an electrode may be bent in the direction in which the force of adhesion is great after the electrode is manufactured. Also, in the present disclosure, it is preferable for Rz of each of the first surface 110a and the second surface 110b to be 2.5 μm or less. In the case in which Rz is greater than 2.5 μm, the force of adhesion with the negative electrode material may be reduced.

Figure 2:
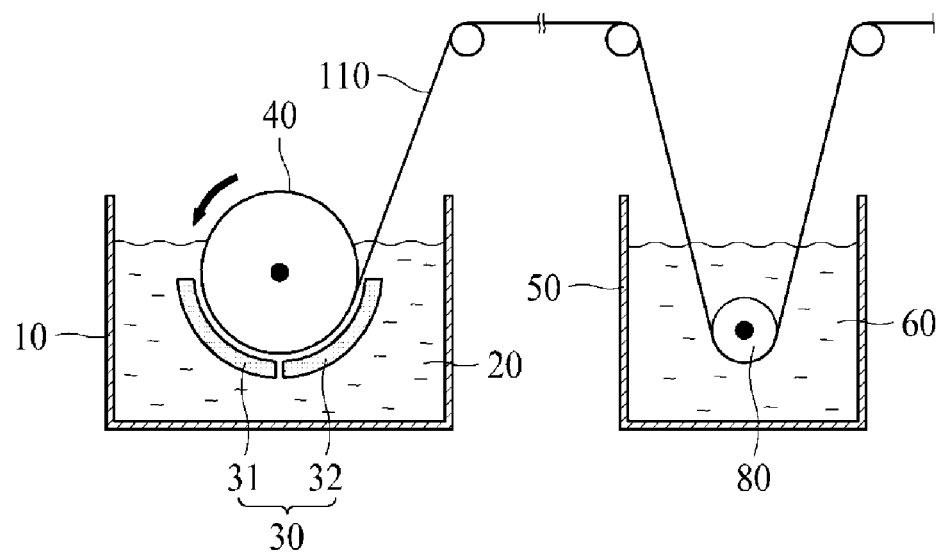
FIG. 2 is a view schematically showing an apparatus for manufacturing the electrolytic copper foil according to the present disclosure.

FIG. 2 is a view schematically showing an apparatus for manufacturing the electrolytic copper foil according to the present disclosure.

As shown in FIG. 2, a positive electrode plate 30 and a rotary negative electrode drum 40 are disposed in an electrolytic solution 20 in an electrolytic bath 10 so as to be spaced apart from each other. In the case in which electric power is applied between the rotary negative electrode drum 40 and the positive electrode plate 30 while the rotary negative electrode drum 40 is rotated in a predetermined direction, plating is performed through electric conduction via the electrolytic solution 20. A copper film 110 plated on the surface of the rotary negative electrode drum 40 is wound on a winding roll (not shown) while being guided by a guide roll 80.

A copper sulfate electrolytic solution, a copper pyrophosphate electrolytic solution, or a copper sulfamate electrolytic solution may be used as the electrolytic solution 20, which deposits the electrolytic copper foil. In the present disclosure, a copper sulfate electrolytic solution is very suitable as the electrolytic solution, and is thus preferably used.

The positive electrode plate 30 may include a first positive electrode plate 31 and a second positive electrode plate 32, which are electrically insulated from each other. The density of the electric current that is supplied by each of the first positive electrode plate 31 and the second positive electrode plate 32 may be 30 to 80 A/dm².

In an embodiment of the present disclosure, the electrolytic solution 20 may include 70 to 100 g/L of copper ions and 80 to 130 g/L of sulfuric acid.

In addition, the electrolytic solution 20 may further include an organic additive. Hydroxyethyl cellulose (HEC), an organic sulfide, an organic nitride, or a mixture thereof may be used as the organic additive. In the present disclosure, 4-mercaptopyridine is preferably used as the organic additive. In addition, the content of total organic carbon (TOC) including the organic additive in the electrolytic solution 20 of the present disclosure is limited to 450 ppm or less.

In the present disclosure, the concentration of the organic additive, particularly 4-mercaptopyridine, may be adjusted in order to adjust the full width at half maximum of (220) plane of the copper foil. Preferably, the concentration of 4-mercaptopyridine is 2 to 17 ppm. In the case in which the concentration of 4-mercaptopyridine is less than 2 ppm, as will be described below, the alteration rate of the full width at half maximum of (220) plane due to heat treatment becomes less than 0.81. In the case in which the concentration of 4-mercaptopyridine is greater than 17 ppm, on the other hand, the alteration rate of the full width at half maximum of (220) plane due to heat treatment becomes greater than 1.19.

The full width at half maximum of (220) plane of the copper foil may also be changed depending on the density of electric current or the flow rate of the electrolytic solution. In the present disclosure, preferably, the density of electric current that is supplied is 30 to 80 A/dm², the temperature of the electrolytic solution 20 is maintained at 50 to 70° C., and the flow rate of the electrolytic solution 20 that is supplied into the electrolytic bath 10 is 35 to 46 m³/hour.

Also, in the present disclosure, it is preferable for the concentration of $Pb^{2+}$ in the electrolytic solution 20 to be 55 ppm or less. In the present disclosure, the concentration of $Pb^{2+}$ in the plating solution is controlled so as to be within an appropriate range in order to control the coefficient of thermal expansion of the copper foil due to temperature changes during the manufacture of a lithium secondary battery. In the case in which the concentration of $Pb^{2+}$ in the plating solution is greater than 55 ppm, $Pb^{2+}$ is also deposited on an electrolytically plated copper foil, whereby the ductility of the copper foil increases, and the coefficient of thermal expansion of the copper foil in a temperature range of 30 to 190° C. exceeds 22 μm/(m·° C.). To this end, a copper wire containing no Pb is used, or chlorine is introduced into the electrolytic solution in order to precipitate Pb ions in the form of $PbCl_2$, whereby the concentration of $Pb^{2+}$ in the plating solution is controlled so as to be within a desired range. Consequently, it is possible to prevent $Pb^{2+}$ from being introduced into the electrolytic copper foil.

Meanwhile, in order to control the weight deviation of the copper foil so as to be 5% or less, the distance between the rotary negative electrode drum 40 and the positive electrode plate 30 must be substantially uniformly maintained within a range of 5 to 15 mm. In addition, the difference between the maximum distance and the minimum distance between the rotary negative electrode drum 40 and the positive electrode plate 30 must be maintained at 0.2 mm or less. In the case in which the difference is greater than 0.2 mm, the lateral weight deviation of the manufactured copper foil exceeds 5%.

The copper film manufactured through plating is introduced into a rust-proof treatment bath 50 along the guide roll 80. In the present disclosure, a rust-proof treatment solution 60 includes chromate. Dichromate, such as $M_2Cr_2O_7$ (where, M is a univalent metal), or a mixture of chromic acid, such as $CrO_3$, alkali hydroxide, and acid may be used as chromate. In addition, the rust-proof treatment solution 60 further includes zinc salt, such as ZnO or $ZnSO_4.7H_2O$. As needed, the rust-proof treatment solution 60 may further include an organic additive, such as a silane compound or a nitrogen compound.

In the present disclosure, rust-proof treatment may be performed using an electrodeposition method, rather than using the above-described immersion method.

Hereinafter, preferred examples of the present disclosure will be described in detail.

<Manufacture of Electrolytic Copper Foil>

A positive electrode plate and a rotary negative electrode drum, disposed in an electrolytic solution in an electrolytic bath so as to be spaced apart from each other, were electrically conducted using an apparatus identical to that shown in FIG. 2 in order to form a copper film on the rotary negative electrode drum.

An electrolytic solution was prepared using 75 g/L of copper ions and 105 g/L of sulfuric acid, and 4-mercaptopyridine was added as an additive. In addition, chlorine ions were added in order to adjust the concentration of Pb.

The manufacturing conditions of the manufactured copper foil are shown in Table 1 below.

TABLE 1

| | TOC (ppm) | $Pb^{2+}$ (ppm) | 4-mercapto-pyridine (ppm) | Maximum distance – Minimum distance (mm) |
|---|---|---|---|---|
| Example 1 | 450 | 22 | 9 | 0.07 |
| Example 2 | 225 | 55 | 9 | 0.07 |
| Example 3 | 225 | 22 | 2 | 0.07 |
| Example 4 | 225 | 22 | 17 | 0.07 |
| Example 5 | 225 | 22 | 9 | 0.20 |
| Comparative Example 1 | 455 | 22 | 9 | 0.07 |
| Comparative Example 2 | 225 | 56 | 9 | 0.07 |
| Comparative Example 3 | 225 | 22 | 1 | 0.07 |
| Comparative Example 4 | 225 | 22 | 18 | 0.07 |
| Comparative Example 5 | 225 | 22 | 9 | 0.21 |

The properties of the manufactured electrolytic copper foil samples (Examples 1 to 5 and Comparative Examples 1 to 5) were measured. The respective properties of the electrolytic copper foil samples were measured as follows.

Coefficient of Thermal Expansion

The coefficient of thermal expansion of each of the copper foil samples was measured using a thermomechanical analyzer (TMA) while the temperature was increased from 30° C. to 190° C. at a speed of 5° C./min.

Alteration Rate of Full Width at Half Maximum of (220) Plane

An XRD pattern was obtained from the M surface of each of the copper foil samples under conditions of a Cu target (Cu $K_{α1}$ rays), a scan speed of 3°/min, and a 2θ distance of 0.01°, and the full width at half maximum of (220) plane was obtained from the obtained XRD pattern.

Each of the copper foil samples was thermally treated at 190° C. for 30 minutes, and the full width at half maximum of (220) plane was obtained using the same method. Subsequently, the alteration rate of the full width at half maximum of (220) plane due to heat treatment was calculated using Equation 1 below.

Alteration rate of full width at half maximum of (220) plane=full width at half maximum of (220) plane after heat treatment/full width at half maximum of (220) plane before heat treatment [Equation 1]

Surface Profile of Copper Foil

Rz and Ra were measured according to JIS B 0601 (2001) standards using a stylus tip from Mitutoyo Company, the model name of which was SJ-310 and which had a radius of 2 μm, under a condition of a measurement pressure of 0.75 mN. At this time, the measurement length, excluding the cut-off length, was 4 mm, the cut-off length was 0.8 mm at the first stage and the last stage, and the average of the values obtained by performing the measurement three times was taken.

Rz and Ra at the M surface and the S surface of each of the copper foil samples were measured, and the value of the difference therebetween was calculated.

Lateral Weight Deviation

Samples, each having a size of 5 cm×5 cm, were taken from the left point, the central point, and the right point of each of the electrolytic copper foils that were located in the lateral direction thereof, and the weight of each of the three samples was measured. Subsequently, the arithmetic mean and standard deviation of the measurement values were obtained, and the weight deviation was calculated using Equation 2 below.

Weight deviation (%)=(standard deviation/arithmetic mean)×100 [Equation 2]

Tears and Wrinkles

Whether a negative electrode was torn and wrinkled during a roll-to-roll process during the manufacture of a secondary battery under negative electrode manufacturing conditions according to the following example was observed with the naked eye.

Bending of Electrode

A negative electrode was manufactured according to the following example, and when the electrode was bent by 5 mm or more in one direction, the electrode was determined to be defective. After the electrode was manufactured, the electrode was cut to a size of 10×10 cm, the cut portion of the electrode was placed on a flat glass plate, the heights of four corners of the electrode portion on the flat glass plate were measured, and the average of the measurement values was taken as the value of bending of the electrode. Bending was measured for the opposite surfaces of the electrode, and the higher value of bending was taken as the value of bending of the electrode.

<Manufacture of Negative Electrode>

A current collector having a width of 10 cm was prepared using each of the electrolytic copper foils manufactured according to Examples and Comparative Examples. On the current collector, 2 wt % of styrene butadiene rubber (SBR) and 2 wt % of carboxymethyl cellulose (CMC) were mixed with 100 wt % of artificial graphite and SiO2, marketed as a negative electrode active material, using distilled water as a solvent in order to manufacture a slurry.

Subsequently, a sample of each of the electrolytic copper foils was spread so as not to be wrinkled and crumpled, and a negative electrode material was coated on the copper foil using a bar coater such that the amount of the negative electrode material that was loaded was 9.0±0.5 mg/cm². At this time, the coating speed of the bar coater was 10 to 15 mm/s. The copper foil having the negative electrode material coated thereon was dried at 100° C. for 15 minutes. The dried copper foil sample was pressed in four stages using a roll press such that the density of an electrode was 1.55±0.05 g/cc in order to manufacture a negative electrode.

<Manufacture of Lithium Secondary Battery>

1 M of $LiPF_6$, serving as a solute, was dissolved in a non-aqueous organic solvent, obtained by mixing ethylene carbonate (EC) and ethyl methyl carbonate (EMC) with each other at a ratio of 1:2, in order to prepare a basic electrolytic solution, and 99.5 wt % of the basic electrolytic solution and 0.5 wt % of succinic anhydride were mixed with each other in order to manufacture a non-aqueous electrolytic solution.

A lithium manganese oxide, such as $Li_{1.1}Mn_{1.85}Al_{0.05}O_4$, and a lithium manganese oxide having an orthorhombic crystalline structure, such as o-$LiMnO_2$, were mixed with each other at a weight ratio of 90:10 in order to manufacture a positive electrode active material. The positive electrode active material, carbon black, and polyvinylidene fluoride (PVDF), serving as a binder, were mixed with each other at a weight ratio of 85:10:5 in NMP, serving as an organic solvent, in order to manufacture a slurry. The manufactured slurry was applied to opposite surfaces of an Al foil having a thickness of 20 μm and was dried in order to manufacture a positive electrode. A lithium secondary battery was manufacturing using the manufactured positive electrode, negative electrode, and electrolytic solution.

Table 2 below shows the results of measurement of the physical properties of the electrolytic copper foil samples manufactured according to Examples of the present disclosure.

TABLE 2

|  | Coefficient of thermal expansion (μm/(mK)) | Alteration rate of full width at half maximum of (220) plane | Weight deviation (%) | Rz difference (μm) | Ra difference (μm) | Tears | Wrinkles | Bending of electrode |
|---|---|---|---|---|---|---|---|---|
| Example 1 | 17.10 | 0.98 | 2.5 | 0.65 | 0.18 | no | no | good |
| Example 2 | 22.00 | 0.99 | 2.5 | 0.64 | 0.15 | no | no | good |
| Example 3 | 19.2 | 0.81 | 2.5 | 0.31 | 0.18 | no | no | good |
| Example 4 | 19.2 | 1.19 | 2.5 | 0.31 | 0.05 | no | no | good |
| Example 5 | 19.2 | 0.98 | 5.0 | 0.31 | 0.05 | no | no | good |
| Comparative Example 1 | 17.00 | 0.99 | 2.5 | 0.66 | 0.19 | yes | no | bad |
| Comparative Example 2 | 22.20 | 0.99 | 2.5 | 0.67 | 0.20 | no | yes | bad |
| Comparative Example 3 | 19.2 | 0.79 | 2.5 | 0.67 | 0.20 | yes | no | bad |
| Comparative Example 4 | 19.2 | 1.22 | 2.5 | 0.68 | 0.21 | no | yes | bad |
| Comparative Example 5 | 19.2 | 0.98 | 5.2 | 0.71 | 0.21 | no | yes | bad |

Referring to Table 2, the electrolytic copper foil samples manufactured according to Examples 1 to 5 had coefficients of thermal expansion of 17.1 to 22.0 μm/(m·K) and alteration rates of full width at half maximum of (220) plane of 0.81 to 1.19. None of the samples having the above coefficients of thermal expansion were torn or wrinkled in a process of manufacturing a secondary battery, i.e. each sample was maintained in a good state. In contrast, the sample of Comparative Example 1 had a coefficient of thermal expansion of 17.00 μm/(m·K). Due to this low coefficient of thermal expansion, the sample was torn in the process of manufacturing the secondary battery. The sample of Comparative Example 2 had a high coefficient of thermal expansion of 22.20 μm/(m·K), whereby the sample was wrinkled. In addition, the samples of Comparative Examples 3 and 4 had coefficients of thermal expansion within an appropriate range; however, the alteration rates of full width at half maximum of (220) plane of the samples deviated from a predetermined range, whereby the samples were torn or wrinkled.

In addition, the sample of Comparative Example 5 had a coefficient of thermal expansion and a alteration rate of full width at half maximum of (220) plane similar to those of Example 5. However, the sample was wrinkled, since the sample had a high weight deviation value.

Meanwhile, in the case of each of the copper foil samples manufactured according to Comparative Examples 1 to 5, the Rz difference between the M surface and the S surface deviated from a predetermined range (0.3 to 0.65), or the Ra difference between the M surface and the S surface deviated from a predetermined range (0.05 to 0.18), which causes bending of an electrode.

As is apparent from the above description, according to the present disclosure, it is possible to provide an electrolytic copper foil configured such that the possibility of the electrolytic copper foil being wrinkled and/or torn is reduced in a subsequent process of manufacturing a secondary battery by controlling the physical properties of the electrolytic copper foil during the process of manufacturing the electrolytic copper foil.

It will be apparent to those skilled in the art that the present disclosure described above is not limited by the above-described embodiments and the accompanying drawings and that various substitutions, modifications, and variations can be made in the present disclosure without departing from the spirit or scope of the disclosures. Consequently, the scope of the present disclosure is defined by the accompanying claims, and it is intended that all variations or modifications derived from the meaning, scope, and equivalent concept of the claims fall within the scope of the present disclosure.

What is claimed is:

1. An electrolytic copper foil having a first surface and a second surface opposite to the first surface, wherein
   a coefficient of thermal expansion of the electrolytic copper foil, measured while a temperature is increased from 30 to 190° C. at a speed of 5° C./min, is 17.1 to 22 μm/(m° C.),
   an alteration rate of a full width at half maximum of (220) plane of the electrolytic copper foil is 0.81 to 1.19, the alteration rate being obtained by sequentially performing (i) measurement of a first full width at half maximum of (220) plane of a sample of the electrolytic copper foil, (ii) heat treatment of the sample at 190° C. for 30 minutes, (iii) measurement of a second full width at half maximum of (220) plane of the heat-treated sample, and (iv) calculation of the alteration rate using Equation 1 below, Alteration rate of full width at half maximum of (220) plane=full width at half maximum of (220) plane/full width at half maximum of (220) plane,  (Equation 1)

a lateral weight deviation of the electrolytic copper foil is 5% or less,
   a difference between Rz of the first surface and Rz of the second surface of the electrolytic copper foil is 0.65 μm or less, and
   a difference between Ra of the first surface and Ra of the second surface of the electrolytic copper foil is 0.18 μm or less.

2. The electrolytic copper foil according to claim 1, wherein the electrolytic copper foil comprises a first passivation layer, which forms the first surface, and a second passivation layer, which forms the second surface, each of the first passivation layer and the second passivation layer being a rust-proof layer.

3. The electrolytic copper foil according to claim 1, wherein the electrolytic copper foil has a thickness of 4 to 30 μm.

4. The electrolytic copper foil according to claim 1, wherein Rz of the first surface and Rz of the second surface are 2.5 μm or less.

5. A method of manufacturing the electrolytic copper foil according to claim 1 by applying electric current between a positive electrode plate and a rotary negative electrode drum, disposed in an electrolytic solution in an electrolytic bath so as to be spaced apart from each other, in order to electroplate a copper film on the rotary negative electrode drum, wherein the electrolytic solution comprises 70 to 100 g/L of copper ions, 80 to 130 g/L of sulfuric acid, 55 ppm or less of Pb' ions, and 2 to 17 ppm of 4-mercaptopyridine, a content of total organic carbon (TOC) in the electrolytic solution is 450 ppm or less, a distance between the positive electrode plate and the rotary negative electrode drum is 5 to 15 mm, and a difference between a maximum distance and a minimum distance between the positive electrode plate and the rotary negative electrode drum is 0.2 mm or less.

\* \* \* \* \*